R. N. Perlee

Impt. in the manufacture of Lamp Black.

72078

PATENTED
DEC 10 1867

Witness,
Geo. D. Walker
Chas H. Smith

R. N. Perlee
per L. W. Serrell
Atty

UNITED STATES PATENT OFFICE.

R. N. PERLEE, OF JERSEY CITY, NEW JERSEY.

IMPROVEMENT IN THE MANUFACTURE OF LAMP-BLACK.

Specification forming part of Letters Patent No. 72,078, dated December 10, 1867.

*To all whom it may concern:*

Be it known that I, R. N. PERLEE, of Jersey City, in the county of Hudson and State of New Jersey, have invented and made a certain new and useful Improvement in the Manufacture of Lamp-Black; and I do hereby declare the following to be a full, clear, and exact description of the said invention, reference being had to the annexed drawing, making part of this specification, wherein—

Figure 1:
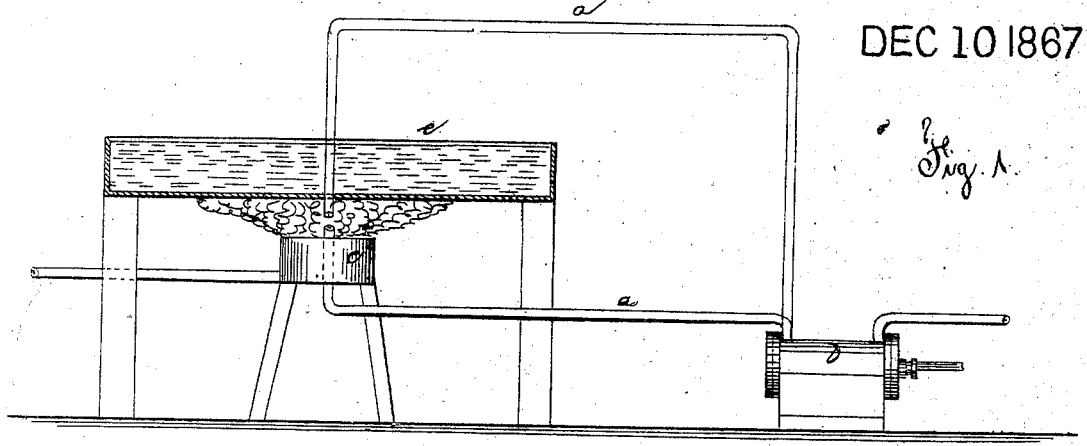
Figure 2:
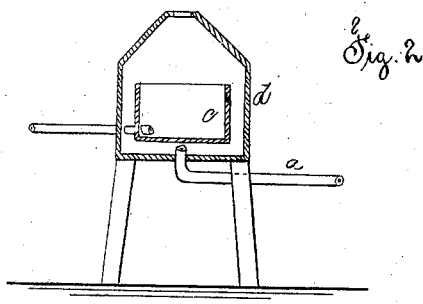

Figure 1 is a section of an apparatus that may be employed in my mode of manufacture, and Fig. 2 is a similar view of part of the apparatus in a modified form.

Similar marks of reference denote the same parts.

Heretofore it has been usual in the manufacture of lamp-black to employ lamps or burners that gave off smoke that was condensed in a room or chamber; but the quality of the black varied, and was seldom of an intense hue and superior quality. I have discovered that a certain amount of atmosphere is required in the manufacture of lamp-black, in order that the necessary quantity of oxygen may be present, and no more, for the conversion of a liquid hydrocarbon into the lamp-black. If too much oxygen is supplied, the yield of lamp-black is lessened in consequence of the carbon being consumed. If too little, the color of the lamp-black is not good.

The nature of my said invention consists in an improvement in the manufacture of lamp-black by forcing a regulated quantity of atmosphere into the flame by artificial means, so as to produce the desired quality of black without waste of the liquid hydrocarbon. To effect this operation I make use of any suitable burner, with or without a wick, and supply to the same the liquid or material to be burned, and I introduce a current of air from a pump, fan, or other blowing apparatus, in the quantity desired, and I direct such air into the flame, either from the outside or inside of the flame.

In Fig. 1 I have shown an air-pipe, *a*, from a blower, *b*, to the burner *c*, said pipe opening within the flame from below; or it might come down from above, as seen by red lines. In Fig. 2 the burner *c* is surrounded with a case, *d*, and the air supplied into that, so as to be directed upon the outside of the flame.

I have shown a pan or vessel over the flame at *e*, containing water, the lamp-black being condensed on the under side thereof, and removed from time to time. I prefer this mode of collection, but do not limit myself thereto.

What I claim, and desire to secure by Letters Patent, is—

The method herein specified of manufacturing lamp-black by introducing atmospheric air to the flame by artificial means, for the purposes set forth.

In witness whereof I have hereunto set my signature this 12th day of October, A. D. 1867.

R. N. PERLEE.

Witnesses:
CHAS. H. SMITH,
GEO. D. WALKER.